C. H. JENKINS.
LOCOMOTIVE.
APPLICATION FILED JULY 6, 1909.
985,744.
Patented Feb. 28, 1911.
2 SHEETS—SHEET 1.
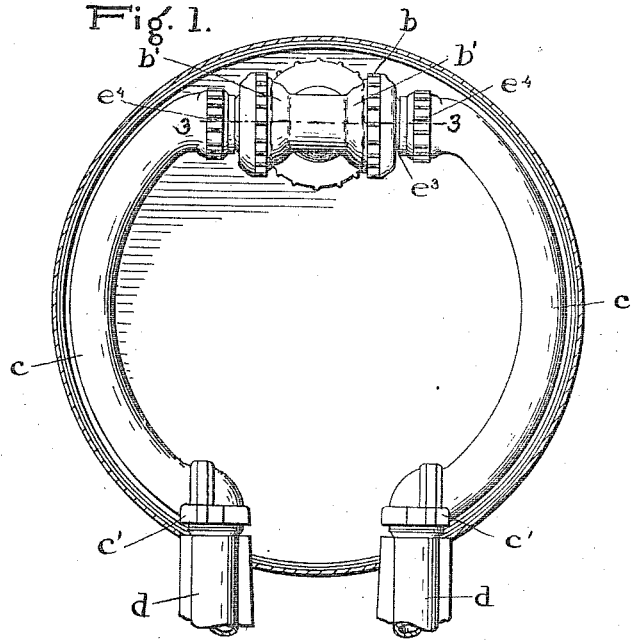
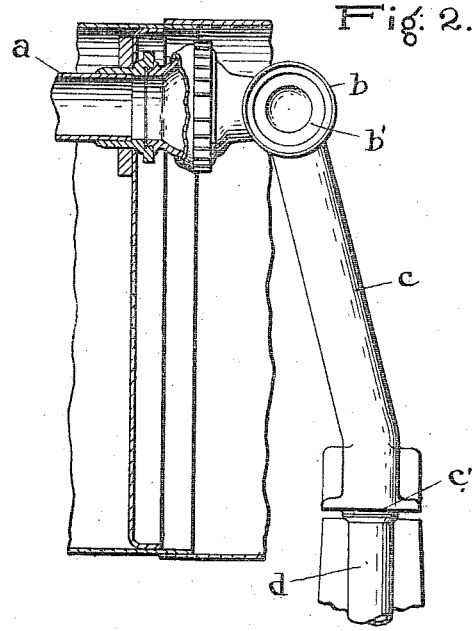
Witnesses
Inventor
Charles H. Jenkins
by E. W. Anderson
his Attorney

C. H. JENKINS.
LOCOMOTIVE.
APPLICATION FILED JULY 6, 1909.

985,744.

Patented Feb. 28, 1911.
2 SHEETS—SHEET 2.

Witnesses
Stuart Hilder.
George M. Anderson.

Inventor
Charles H. Jenkins
by E. W. Anderson
his Attorney

UNITED STATES PATENT OFFICE.

CHARLES H. JENKINS, OF LOUISVILLE, KENTUCKY, ASSIGNOR OF ONE-HALF TO THOMAS W. MORAN, OF LOUISVILLE, KENTUCKY.

LOCOMOTIVE.

985,744.  Specification of Letters Patent.  Patented Feb. 28, 1911.

Application filed July 6, 1909. Serial No. 506,183.

*To all whom it may concern:*

Be it known that I, CHARLES H. JENKINS, a citizen of the United States, resident of Louisville, in the county of Jefferson and State of Kentucky, have made a certain new and useful Invention in Locomotives; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 3:
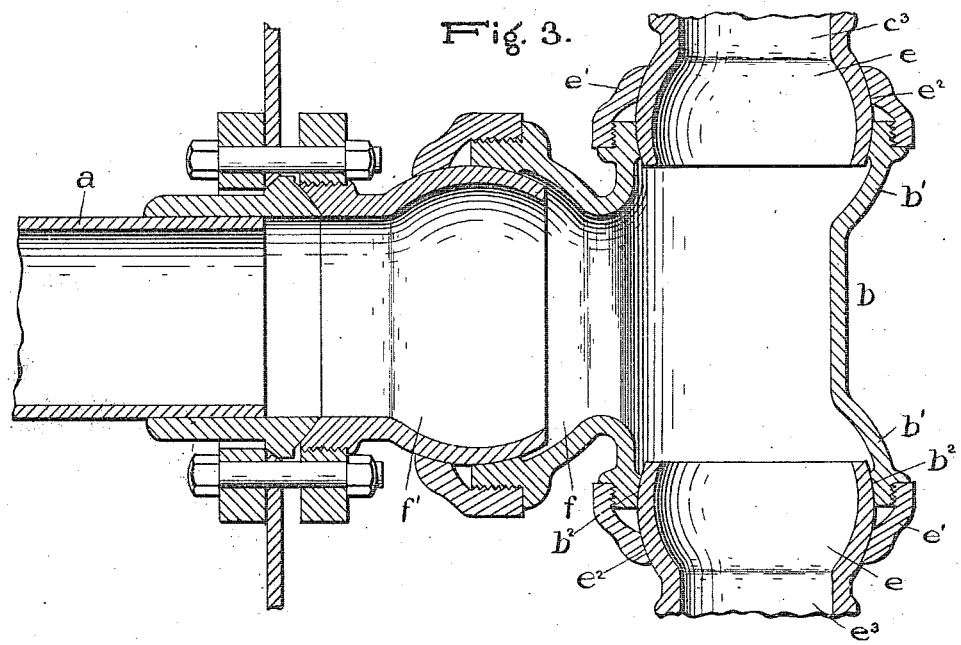
Figure 4:
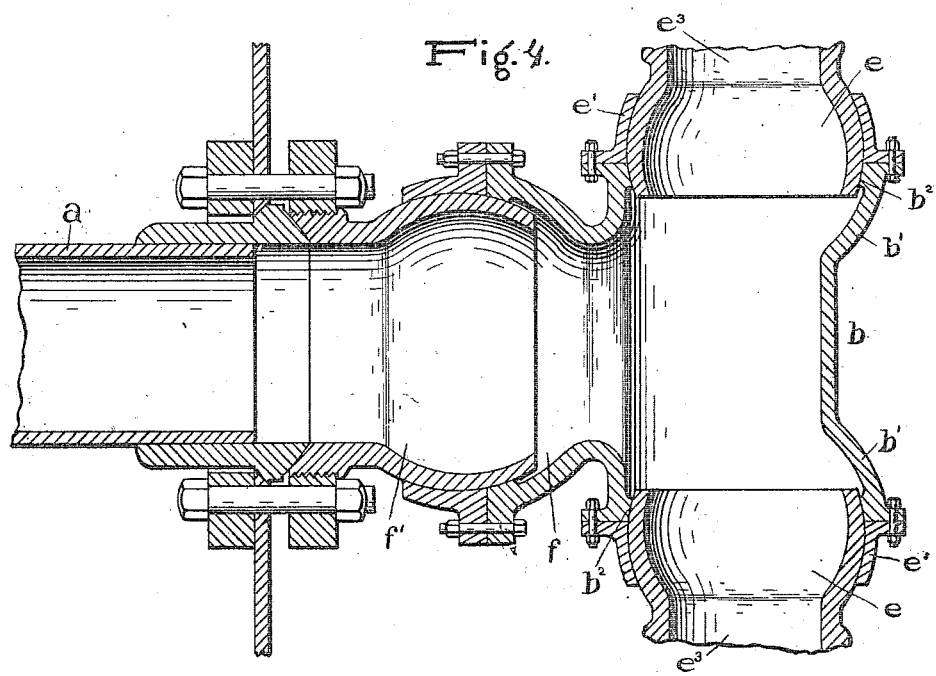

Figure 1 is a side view of the invention as applied to a locomotive. Fig. 2 is an end view of the invention as applied, with one of the pipes leading to the steam cylinders removed and with the locomotive parts shown in section. Fig. 3 is a section on the line 3—3, Fig. 1, with parts broken away. Fig. 4 is a similar view showing a modification.

The invention relates to pipe joints and is particularly designed for the steam pipes at the front end of a locomotive which connect the boiler with the cylinders.

The invention consists in the novel construction and combinations of parts as hereinafter set forth.

In the accompanying drawings, illustrating the invention, the letter $a$, designates the horizontal steam pipe leading from the boiler and having a T-joint connection $b$, with the downward extending pipes $c$, $c$, leading to the steam cylinders. It has been found in practice that the joint connections of the pipes $c$, $c$, with the T-joint $b$, and at the bottom at $c'$, $c'$, with the connections $d$, $d$, running to the cylinders, are liable to become strained through the expansion and contraction of the parts, added to the great vibration to which they are subjected, resulting in leakage of steam, which be it ever so slight, owing to the great steam pressure, affects materially the steaming power of the locomotive. In order to avoid this objectionable leakage applicant provides the T-joint connection $b$, with opposite expanded hollow cup or bell portions $b'$, $b'$, having each a ground bearing or seat $b^2$, in which fits a hollow ball $e$, a separate clamping ring $e'$, having a ground seat or bearing $e^2$, for the ball fitting over the same and having suitable connection with the expanded cup or bell of the joint. This connection in the drawings, Fig. 3 is shown as a direct screw connection, although it may be made by means of bolts if desired, as shown in Fig. 4. The neck portions $e^2$, $e^2$, of the balls are secured to the steam pipes $c$, $c$, at $e'$, $e'$. The T-joint connection $b$, may be further provided at its connection with the boiler pipe $a$, with an expanded cup or bell portion $f$, in which fits the hollow ball $f'$, extending from and having its hollow neck portion communicating with the boiler pipe, providing an additional universal joint connection the details of which are the same as above explained for the other universal joints, all of which are made of such metal or material as may be found best. In this way not only will all objectionable expansion and contraction, vibration or other movement whatsoever taking place at any of the joints between the dry pipe $a$, and the cylinders be taken up, but the difficulty of making the steam pipe connections between the T-joint and the steam cylinders will be done away with by the universal joint connection between the T-joint and the boiler pipe, which allows the T-joint to be moved so as to shorten or lengthen the distance between the cylinder and the same.

By the use of the applicant's invention a plain all-metal steam joint connection may be used at $c'$, $c'$, at the bottom of the steam pipes leading from the T-joint. Many incidental advantages will also result, as avoidance of expense and loss of time in repairing the leaks when the locomotive, which is practically put out of commission, must be sent to the shops, loss of tonnage on account of the locomotive not being able to haul its full capacity, and time saved in putting in the steam pipes in the front end of the locomotive.

Having thus described the invention, what I claim as new and desire to secure by Letters Patent is:

In a locomotive, the combination with a boiler having a rigid steam supply pipe, steam cylinders, and connection pipes between said steam supply pipe and said cylinders, of means for taking up vibration and expansion and contraction comprising a band surrounding the end of said steam supply pipe and having a tapered end, a hollow ball having a stem provided with a tapered end fitting against the tapered end of said band, means connecting the stem of said ball joint and said band to make the engagement of the tapered ends steamtight, a T-form pipe joint body having movable steamtight engagement with said hollow ball, and opposite hollow balls having rigid steamtight connection with the upper ends of said connecting pipes, said T-form body having also movable steamtight engagement with said opposite balls.

In testimony whereof I affix my signature, in presence of two witnesses.

CHARLES H. JENKINS.

Witnesses:
  L. M. LANDER,
  E. H. BOSTON.